United States Patent [19]
Koksbang

[11] Patent Number: 5,334,334
[45] Date of Patent: Aug. 2, 1994

[54] METHOD OF PREPARING LITHIUM BATTERY ELECTRODE COMPOSITIONS

[75] Inventor: Rene Koksbang, San Jose, Calif.

[73] Assignee: Valence Technology, Inc., San Jose, Calif.

[21] Appl. No.: 40,061

[22] Filed: Mar. 30, 1993

[51] Int. Cl.$^5$ ............................................. B29C 35/16
[52] U.S. Cl. ........................................ 264/28; 423/65;
423/179.5; 423/593; 423/641
[58] Field of Search .................. 264/5, 28; 423/62, 65,
423/179.5, 593, 592, 641; 501/99, 94

[56] References Cited

U.S. PATENT DOCUMENTS

| | | | |
|---|---|---|---|
| 2,992,892 | 7/1961 | Goren | 423/65 |
| 4,039,582 | 8/1977 | Nasyrov et al. | 423/592 |
| 4,243,624 | 1/1981 | Jacobson et al. | 264/82 |
| 4,548,792 | 10/1985 | Rodriguez et al. | 423/65 |
| 4,665,040 | 5/1987 | Kurita et al. | 501/105 |
| 4,830,939 | 5/1989 | Lee et al. | 429/192 |
| 5,013,620 | 5/1991 | Miyazaki et al. | 429/194 |
| 5,039,582 | 8/1991 | Pistoia | 429/218 |

Primary Examiner—Allan R. Kuhns
Attorney, Agent, or Firm—Linda Deschere

[57] ABSTRACT

Fine particles of vanadium oxide or compound thereof, respectively represented by the general formulas $V_2O_5$ and $LiV_3O_8$, are prepared by freeze-drying a wet mixture containing a precursor. Alternatively, such oxide or compound is prepared in fine particle form intimately mixed with fine particles of carbon, also by freeze-drying.

25 Claims, 5 Drawing Sheets

METHOD OF PREPARING LITHIUM BATTERY ELECTRODE COMPOSITIONS

FIELD OF THE INVENTION

This invention relates to electrochemical batteries and more particularly to improved positive electrode material for use with lithium-containing negative electrodes.

BACKGROUND OF THE INVENTION

Current batteries contain high surface area transition metal oxide active material such as vanadium oxide powders. These oxide powders are obtained, for example, by milling of vanadium oxide material. Current methods for the manufacture of powders involve mechanical grinding of vanadium oxide material prepared, for example, by rapid quench of molten material or by precipitation from an aqueous solution. As a result, the vanadium oxide is in the form of lumps or large particles. By standard milling techniques it is difficult to reduce the lumps to a size less than 100 micrometers (microns) and extremely difficult to achieve closer to 10 microns. Smaller vanadium oxide particle sizes are desirable because the larger the surface area, the higher is the current drawn from a battery while the current density on the surface of the vanadium oxide active material remains low which allows high utilization of the active material. A typical coarse $V_2O_5$ powder of 95% purity available from Fisher Scientific Company, has a median particle size of about 110 microns and a surface area of about 5 meters$^2$/gram. Such a powder would need extensive milling.

Another problem posed by transition metal oxide active material is that it is necessary to add carbon to the composite cathode. The requirement for carbon and the amount thereof depends, to some extent, on the specific oxide. The electronic conductivity of vanadium oxides decreases substantially (2–4 orders of magnitude) during lithium insertion upon discharge of a battery. This increases the need for even greater amounts of added carbon. Methods which allow reduction of the carbon content are important in order to increase the specific energies of the battery.

SUMMARY OF THE INVENTION

According to one aspect of the invention, very fine particles of an oxide of vanadium, represented by the general formula $V_2O_5$, are prepared by first forming a wet mixture comprising at least one volatile constituent and vanadium pentoxide, and then freeze-drying the wet mixture. Freeze-drying is preferably conducted by cooling the volatile constituent to a temperature below the freezing point of such constituent under a vacuum thereby providing very fine particles of the oxide of vanadium, nominally $V_2O_5$, having a size on the order of 100 microns or less. Desirably, particles of a median size less than about 50 microns are produced, and preferably less than 10 microns. It should be noted that median particle size refers to that size at which 50% by weight of the particles are, respectively, above and below in size.

The method of the invention is conducted under a vacuum and at an absolute pressure of less than 5 millimeter of mercury (mm Hg abs.), desirably less than 1.0 mm Hg abs., and preferably less than 0.1 mm Hg. A suitable level ranges as low as less than 0.001 mm Hg. Preferably, the volatile constituent is water and the temperature at which freeze-drying takes place is at about 0° C. or less. Desirably, the temperature is −10° C. or less and preferably is in a range of about −10° C. to about −40° C. A suitable range is −20° C. to −30° C.

According to another aspect of the invention, there is provided a method for preparing an electrode material comprising fine particles of vanadium oxide and carbon. In this embodiment, the wet mixture comprising the volatile constituent(s) and an oxide of vanadium also includes fine particles of carbon. The oxide of vanadium is preferably represented by the general formula $V_2O_5$. The wet mixture is freeze-dried by bringing the wet mixture to a temperature below the freezing point of the volatile constituent under a vacuum thereby providing fine particles of vanadium oxide intermingled with the fine particles of carbon. The carbon particles are dispersed in the wet mixture and maintained in dispersion while freeze-drying occurs. The conditions under which freeze-drying occurs in this case, are similar to the conditions previously recited where carbon particles are not included.

According to another aspect of the invention, fine particles of lithium-vanadium oxide of the nominal general formula $LiV_3O_8$ are prepared by forming a wet mixture comprising at least one volatile constituent, lithium hydroxide (LiOH) and an oxide of vanadium represented by the general formula $V_2O_5$. The LiOH is reacted with the $V_2O_5$ for a time and at a temperature sufficient to provide the lithium-vanadium oxide, $LiV_3O_8$. Desirably, the reaction takes place at a temperature of at least about 20° C.; and preferably in a range of about 0° C. to 60° C. It is desired that the LiOH be present in an amount sufficient to provide 1 mole of Li for each 1.5 moles of the $V_2O_5$. Once the reaction to form $LiV_3O_8$ is completed, the mixture containing the $LiV_3O_8$ product is freeze-dried at a temperature below the freezing point of the volatile constituent under a vacuum thereby providing fine particles of a lithium-vanadium oxide; where the median size of the particles are less than about 100 microns. Preferably, particles of a median size less than 10 microns are produced.

If desired, prior to freeze-drying, the wet mixture may also include fine particles of carbon dispersed therein. The carbon may be added either before or after the reaction to form $LiV_3O_8$ takes place. Upon freeze-drying, the product contains fine particles of $LiV_3O_8$ intermingled with the fine carbon particles.

Advantageously, the invention provides very fine particles of vanadium oxide or compounds thereof with or without carbon particles. The fine particles of the oxide powder are advantageously obtained in their preferred size, while minimizing formation of agglomerates which render such powders less effective for use as a cathode active material.

It is an object of the invention to provide electrodes of improved specific energies by reducing vanadium oxide particle size and by improving contact between oxide particles and conductive carbon of the electrode. Other objects include reducing cost of production, reducing or eliminating milling, and increasing consistency and purity of the electrode active material.

These and other objects, features and advantages will become apparent from the following description of the preferred embodiments, appended claims and accompanying drawings.

BRIEF DESCRIPTION OF THE DRAWINGS

FIGS. 3 (a & b), 4 (a & b) and 6 show voltage curves of cathodes having freeze-dried and heat treated vanadium oxide compositions of the invention.

DETAILED DESCRIPTION OF THE PREFERRED EMBODIMENTS

Figure 1:
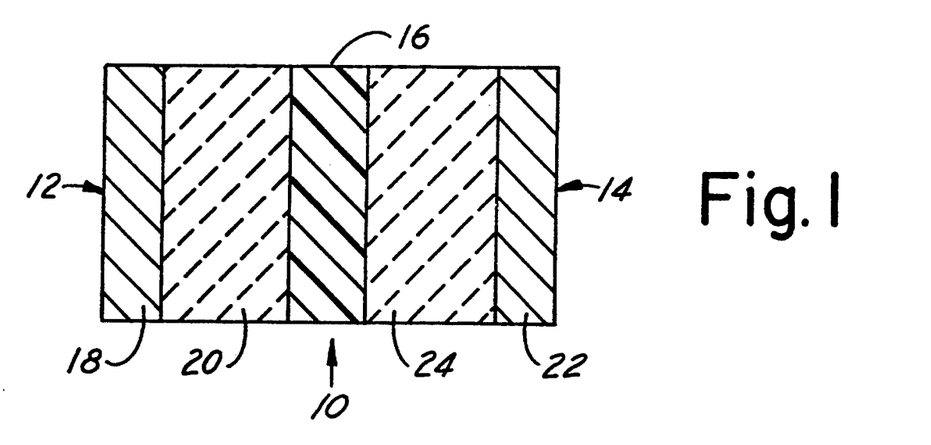
FIG. 1 is an illustration of a cross-section of a thin battery or cell embodying the invention.

As shown in the drawings, an electrochemical cell or battery 10 has a negative electrode side 12, a positive electrode side 14, and a separator 16 therebetween (FIG. 1). In accordance with common usage, a battery may consist of one cell or multiple cells. The negative electrode is the anode during discharge, and the positive electrode is the cathode during discharge. The negative electrode side includes current collector 18, typically of nickel, iron, stainless steel, and/or copper foil, and a body of negative electrode active material 20. The negative electrode active material 20 is sometimes simply referred to as the negative electrode. The positive electrode side includes current collector 22, typically of aluminum, nickel, iron, stainless steel, and/or copper foil, or such foils having a protective conducting coating foil, and a body of positive electrode active material 24 which has as its main component one or more oxides of vanadium. The positive electrode active material 24 is sometimes simply referred to as the positive electrode. The separator 16 is typically a solid electrolyte, electrolyte separator. A suitable electrolyte separator (polymer electrolyte) is described in U.S. Pat. No. 4,830,939 incorporated herein by reference. The electrolyte separator is a solid organic polymer matrix containing an ionically conducting liquid with an alkali metal salt and the liquid is an aprotic polar solvent.

In one embodiment, a cathode active material of the nominal general formula $V_2O_5$ (vanadium pentoxide) is prepared in powder form. The fine particles of the powder are of a size on the order of 100 microns or less. The powder is prepared by first forming a mixture comprising at least one volatile constituent and an oxide of vanadium represented by the general formula $V_2O_5$. The mixture is freeze-dried by cooling the volatile constituent to a temperature below the freezing point of the volatile constituent under a vacuum thereby providing fine particles of the oxide of vanadium. Freeze-drying results in formation of fine particles or a product readily friable into constituent fine particles because freeze-drying prevents coagulation of constituents into a strongly adhered mass. The friable product is very porous, having a density on the order of about 100 milligrams per millimeter (mg/ml) or less. A density of about 20 mg/ml is observed from the xerogel ($V_2O_5$ gel). Density of the friable product may be greater than 100 mg/ml if less water is used in the precursor.

If desired, carbon particles are dispersed in the mixture before freeze-drying so as to provide fine particles of carbon intermingled with the vanadium oxide. The process of freeze-drying facilitates dispersion of and an intermingling of the oxide and carbon constituents in the final product, and prevents coagulation of the constituents into a strongly adhered mass. Thus, the form of the product of the invention is a very fine powder having fine particles of both carbon and oxide less than 100 microns, desirably less than 50 microns, and preferably less than 10 microns.

The process of freeze-drying is a special case of sublimation. In the process of the invention, water is the volatile constituent to be removed, although the wet mixture may include other components. It is known that 1 gram of vanadium pentoxide ($V_2O_5$) dissolves in about 125 milliliters of water. With lesser amounts of water, a viscous liquid or gel is formed. Such low water content gels are known as "xerogels".

During the process, water in the frozen or solid state, is sublimed and is removed or separated from the oxide directly as a vapor. Since the vapor pressure of ice is considerably below atmospheric pressure, freeze-drying requires high vacuum. From a theoretical point of view, if the water present was in a pure state, then theoretically it would be possible to freeze-dry materials at or near 0° C. at a pressure of a few millimeters Hg abs. Since, however, the water exists in the mixture in a combined state, it is necessary to cool to temperatures below 0° C. in order to keep the water in the solid phase. When using water as the volatile constituent (vehicle) to be removed, freeze-drying is conducted under conditions as follows: The method of the invention is conducted under a vacuum and at an absolute pressure of less than 5 millimeter of mercury (mm Hg abs.), desirably less than 1.0 mm Hg abs., and preferably less than 0.1 mm Hg. A suitable level ranges as low as less than 0.001 mm Hg. Preferably, the volatile constituent is water and the temperature at which freeze-drying takes place is at about 0° C. or less. Desirably, the temperature is −10° C. or less and preferably is in a range of about −10° C. to about −40° C. A suitable range is −20° C. to −30° C.

During freeze-drying, the solid (water) sublimes at a rate which is a function of the heat input necessary to supply heat of sublimation, that is, the heat absorbed by the water in its transformation from solid to vapor.

The equipment necessary to accomplish freeze-drying depends on the quantity of material being freeze-dried. If a flask is used, the wet mixture may be frozen in the flask in a dry ice-methanol bath. The frozen matter (i.e. water) is driven off for a sufficient period of time under a vacuum using a vacuum pump. The freeze-drying is continued until the moisture content is reduced to a sufficient level desirably on the order of 1% by weight or less. Depending on the solid concentration of the wet mixture and the degree of dryness required, the process may take more than an hour. To further ensure that small particle size is achieved during the freeze-drying process, it may be desirable to place the precursor materials in a sieve and filter them to first remove large particles. This ensures that carbon particles, which do not dissolve in water, are of a sufficiently small size in the final product.

The solid content of the aqueous mixture was in the range of 100 grams to 200 grams of vanadium pentoxide solid per 400 ml of water. When carbon is included, the solid content (carbon and $V_2O_5$) is adjusted to provide about 5 parts $V_2O_5$ for each 1 part carbon as discussed further herein below. A discussion of the basic techniques of a freeze-drying process may be found in Perry's "Chemical Engineer's Handbook", 4th Edition, published by McGraw Hill. A more specific discussion of freeze-drying may be found in U.S. Pat. No, 4,665,040 to Kurita et al, which is incorporated herein by reference.

In another embodiment, the method of the invention can be used to prepare lithium-vanadium oxide of the nominal general formula $LiV_3O_8$ in a completely amorphous state with or without carbon. The amorphous state is beneficial for rate capabilities and energy density. This composite is prepared by forming the aqueous $V_2O_5$ mixture, as described above and including LiOH in the mixture. The amount of $V_2O_5$ and LiOH correspond to the stoichiometric amounts of the two compounds needed for formation of $LiV_3O_8$. It is thought that part of the $V_2O_5$ dissolves in solution, followed by reaction between the dissolved $V_2O_5$, LiOH and water and then with the remaining solid $V_2O_5$, with the subsequent formation of $LiV_3O_8$. The reaction is fairly slow at room temperature, but proceeds at a reasonable rate at 50° C. to 60° C. A process of adding progressive amounts of vanadium pentoxide to an LiOH solution is more fully described in U.S. Pat. No. 5,039,582 which is incorporated in its entirety by reference. The $LiV_3O_8$ product typically forms a very fine precipitate.

The aqueous mixture containing the $LiV_3O_8$ product is then freeze-dried by cooling to a temperature below the freezing point of the volatile constituent (water) under a vacuum thereby providing fine particles of the lithium-vanadium oxide ($LiV_3O_8$).

If desired, prior to freeze-drying, carbon particles are dispersed in the aqueous solution either before or after reaction to form $LiV_3O_8$ takes place. Preferably, the reaction to form $LiV_3O_8$ is conducted while keeping the carbon and undissolved $V_2O_5$ dispersed in solution, so that the contact between the product $LiV_3O_8$ and the carbon is optimized. Advantageously, because part of the $V_2O_8$ is dissolved during the procedure, intimate mixing between the $V_2O_5$ precursor from which the $LiV_3O_8$ is formed and the carbon, is essentially automatically achieved.

Carbon particles may be obtained from Noury Chemical Corporation, under the designation Ketjen Black. The Ketjen Black particles, in an as-received condition, have a BET surface area of approximately 900 $m^2$/gram. Ketjen Black has an average or median particle size or equivalent average diameter in the range of about 10 to about 100 nanometers (0.01 to 0.1 microns), and typically in the order of 30 nanometers. Thus, the carbon particles and oxide particles are very fine and of micron or submicron size.

The product of the method of the invention is essentially in the form of carbon particles coated with the vanadium oxide or lithium-vanadium oxide ($LiV_3O_8$) or, depending on the relative sizes of the carbon particles and the vanadium oxide particles, the oxide particles may be coated with carbon. In any event, intimate mixing and intimate contact between carbon grains and oxide grains is achieved by the method of the invention. Thus, the advantages of this procedure are that there is improved grain-to-grain contact between carbon and vanadium oxide particles ($V_2O_5$ or $LiV_3O_8$), and also between the various carbon particles, which enhances the electric contacts in the carbon and vanadium oxide network of the composite electrode.

Based on experience obtained from experiments, it has been observed that it is best to minimize the amount of water (volatile constituent) because it has to be removed again and a smaller amount of water is removed faster. Following the preparation procedure, the $V_2O_5$ is added to the LiOH solution. If the $V_2O_5$ is added sufficiently slowly, it is clearly dissolved. The initial suspension of the powder is seen as particles which gradually disappear and the solution then becomes clear.

The $LiV_3O_8$ prepared according to the stated procedure may actually be a fine powder, but because of the high concentrations used, it appears as a high viscosity liquid, cream, or gel. It is this liquid which is used for freeze-drying. Similar liquids of $V_2O_5$ are also formed. The two types of liquids are similar. The $V_2O_5$ is called a xerogel, as a matter of fact, it is the gel which have given this type of materials their group name xerogel. The particle size probably depends on the viscosity of the liquids. Lower viscosity probably result in smaller particles.

A typical composition is used for the formation of $LiV_3O_8$ is as follows: 400 ml $H_2O$; 12 g LiOH (=0.5 mol); 136.5 g $V_2O_5$ (=0.75 mol).

In various experiments, the LiOH was dissolved in the water and heated to about 50° C. The $V_2O_5$ was then added gradually over a period of 2-30 minutes. The rate of adding the $V_2O_5$ did not seem to affect the result. Similarly, the temperature had been varied between approximately 50° C. and 85° C. without any noticeable effect. It is probably possible to prepare the $LiV_3O_8$ gel even when the concentrations of LiOH and $V_2O_5$ are reduced to one third of the amounts given above. Similarly, it is possible to increase the concentration about a factor of 4, but in this case, the resulting material is practically solid. Better, smaller particle size are expected at lower concentrations; however, the correlation between viscosity and the initial composition is not well-known.

In one exemplary procedure, batches of 100-250 ml gel of $LiV_3O_8$ and $V_2O_5$ is frozen as a 1 to 2 cm thick layer on the inside of cylindrical glass containers. This is done in one half to one hour at $-40°$ C. with frequent rotation of the containers. These containers are attached to the HETOSIC unit and evacuated to 0.1 mbar. The evaporation required energy, and the temperature is reduced further unless heat is supplied from an external source. In a production unit, it is preferred to maintain the frozen state and simultaneously supply heat to increase the evaporation rate as much as possible. After 1 to 2 days, depending on sample size, the ice layer developed on the outside of the containers disappeared and the containers were no longer cold to the touch. The containers were dismantled and the content crumbled in a mortar with pestle by hand. The unit used in this procedure consisted of: HETOFRIG freeze bath, type CB 4/512; HETOSIC laboratory freeze-dryer/ice condenser, type CD52; EDWARDS vacuum pump, type Speedivac ED150.

After freeze-drying, the material may look like one big lump. However, the lump is very porous and easily disintegrates into constituent particles of the oxide. Thus, if the lump is touched with very little pressure, it crumbles. The porosity depends on the initial water content, higher water content results in higher porosity. Smaller particle size is probably also obtained with higher water content and an optimum between particle size and preparation rate is inevitable. However, the particle size of the material used in batteries should be less than 10 $\mu m$, and preferably be of submicron size.

Based on experience obtained from experiments, it has been found that after freeze-drying of $LiV_3O_8$ gel, the water content may still be rather high even though acceptable particle size is achieved. Therefore, it is necessary to heat treat this product at 300° C. to 350° C. in order to get a high-capacity, reversible electrode material. After freeze-drying, the quasi-amorphous product still contain as much as 20% water, which can be gradually eliminated upon heat treatment. Material heat treated at 150° C. still contain 4% water, and show discharge curves typical of an amorphous material and the cyclability is poor. Heat treatment at 350° C. eliminates nearly all water, and the resulting product behaves like crystalline $LiV_3O_8$ as electrode material in Li-cells. Detailed results are reported below.

Chemical Analysis

The composition of the lithium vanadium oxide obtained after freeze-drying of aqueous gels was determined by wet chemical analysis. The total amount of vanadium and the oxidation state of vanadium was determined by redox titrations, and the lithium content was determined by flame emission spectroscopy. The results are calculated as equivalent weights ("Eqw"), and summarized in Table 1.

TABLE 1

| Batch # | Heat Treatment | Analysis | Formula (Purity) |
|---|---|---|---|
| RKLC 921001T | none | Eqw/V: 118.1 ± 0.6<br>Ox(V): 5.00<br>Eqw/Li: 347 ± 2 | $Li_{1.02}V_3O_{8.01}$ (81%) |
|  | 150° C. | Eqw/V: 100.0 ± 0.4<br>Ox(V): 5.00<br>Eqw/Li: 297 ± 1 | $Li_{1.01}V_3O_{8.00}$ (96%) |
| 921019 | 150° C. | Eqw/V: 99.9 ± 0.2<br>Ox(V): 5.00<br>Eqw/Li: 309.0 ± 0.4 | $Li_{0.97}V_3O_{7.99}$ (96%) |

It is assumed that the main "impurity" is water, probably bound strongly in the structure of the oxide, as is well-known with other vanadium oxides obtained via a gel-route.

Heat Treatment

A high water content was found in product obtained by freeze-drying, 16% to 19% water by weight. The reduction of the water content upon heat treatment in air was calculated either from weight loss (W) or from the residual not accounted for by chemical, V, Li, Ox analysis (C). The changes in water content of a sample subjected to a series of heat-treatment is given in Table 2.

TABLE 2

| Temperature | Duration | Method | Water Content |
|---|---|---|---|
| no treatment batch 1 |  | C | 18.7% |
| no treatment batch 2 |  |  | 15.9% |
| 60° C. | 24 h | W | 12.3% |
| 100° C. | +24 h | W | 7.6% |
| 150° C. | +24 h | W | 4.4% |
| 150° C. | +24 h | W | 4.0% |
| 150° C. | 72 h | C | 4.0% |
| 350° C. | 24 h | W | 1.3% |

X-Ray Diffraction

Figure 2:
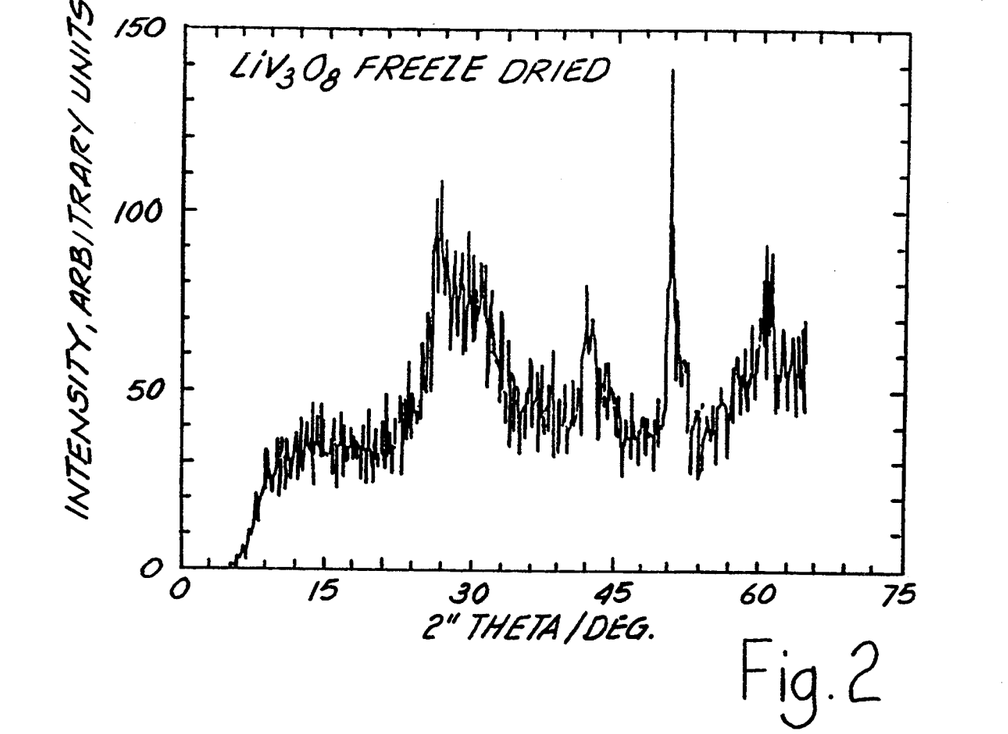
FIG. 2 is an x-ray diffraction pattern (diffractogram) of a freeze-dried vanadium oxide composition.

The freeze-dried product has a very low crystallinity, although it is not completely amorphous to x-rays, as it can be seen from the diffractogram of the oxide prior to heat treatment on FIG. 2.

Figure 3A:
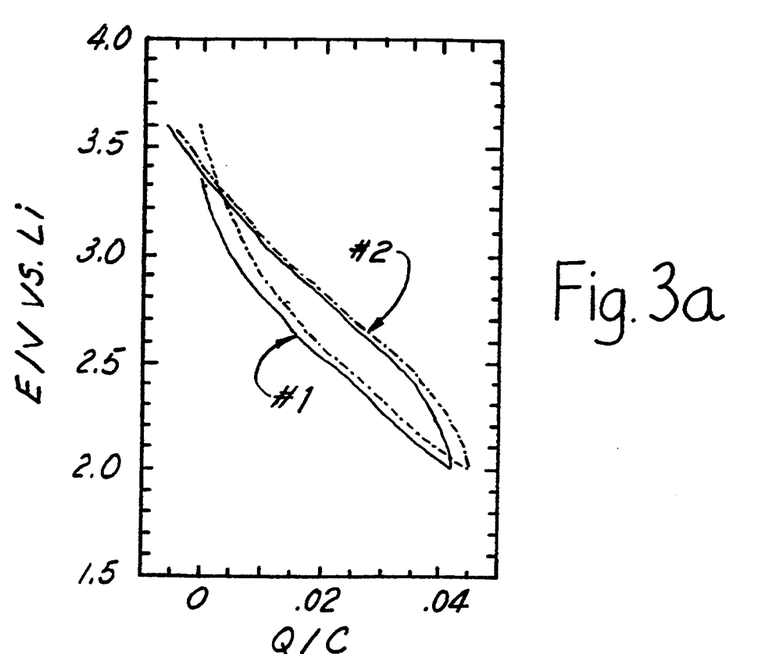
Figure 3B:
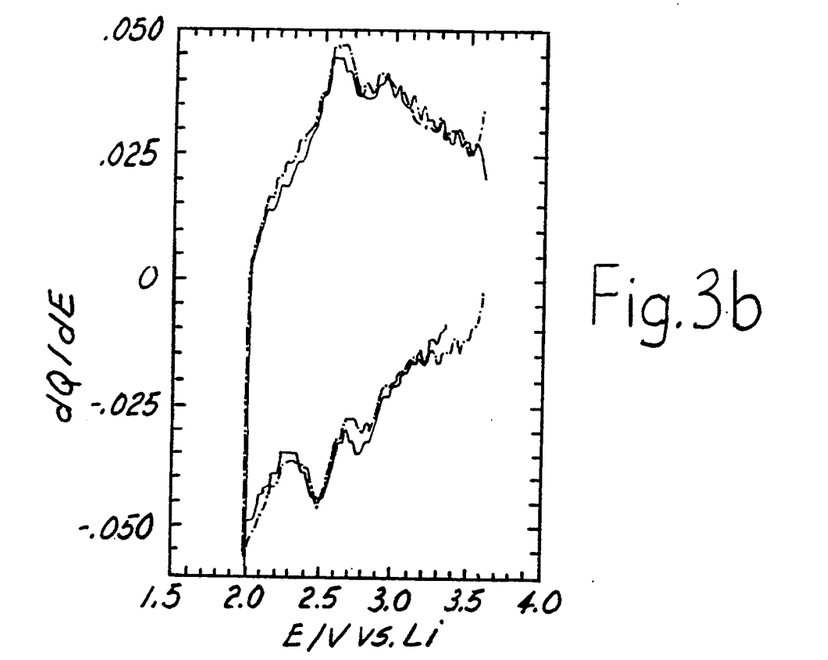
Figure 4A:
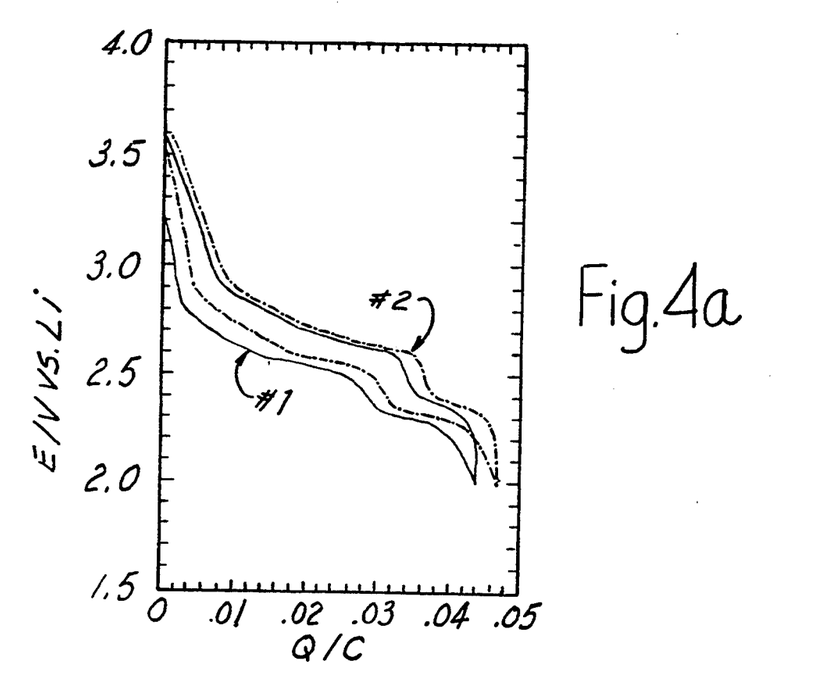
Figure 4B:
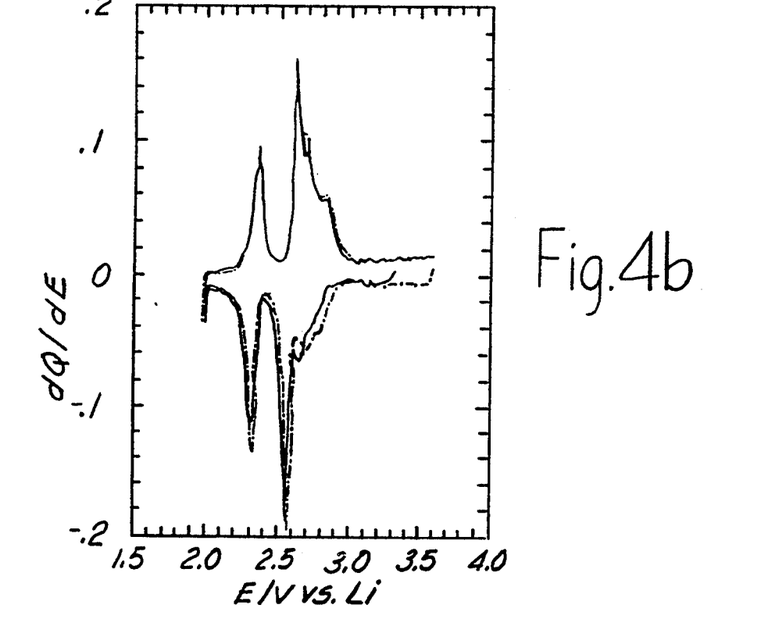
Figure 5:
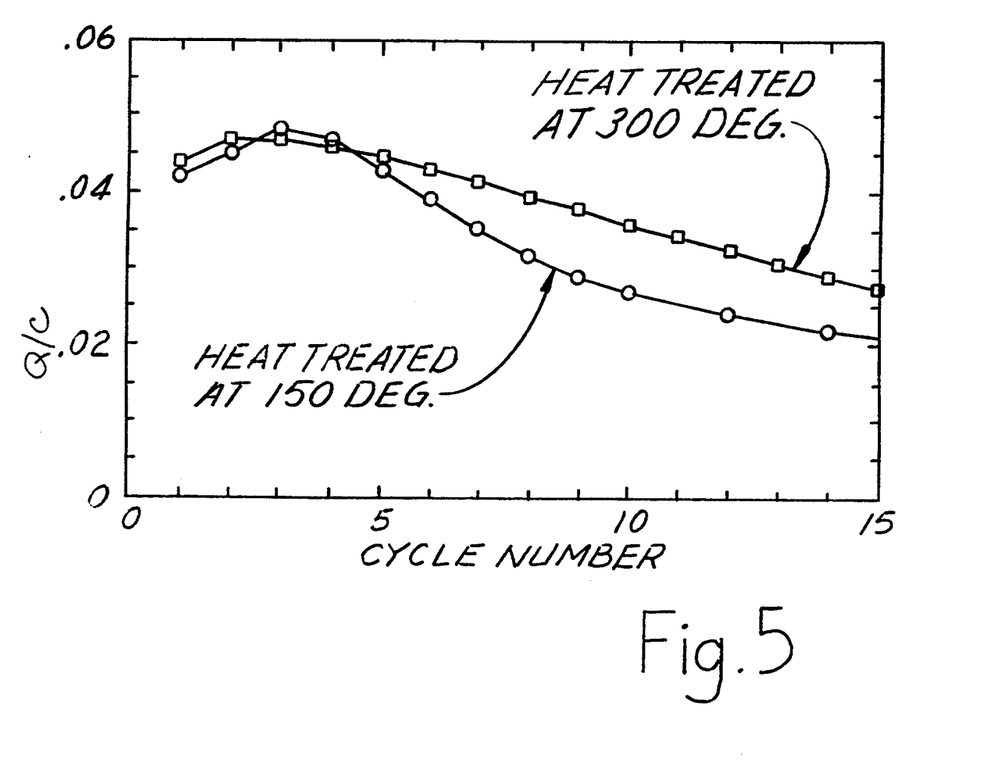
FIG. 5 shows the cyclability of electrodes having freeze-dried and heat treated vanadium oxide compositions of the invention.

The vanadium oxide gel was spin-coated on nickel foils, which were dried and heat-treated either at 150° C. in vacuum or at 300° C. in air, followed by 100° C. in vacuum. These compact electrodes were cycled in cells with PEO-based electrolyte at 100° C. in order to test the influence of the heat treatment on the electrochemical properties of $LiV_3O_8$ obtained via the gel-route. The configuration of a typical cell is discussed below. FIGS. 3 and 4 (both a & b) show typical voltage curves for these cells. In FIGS. 3 and 4, the numerals 1 and 2 designate cycles 1 and 2. The material heat treated at 150° C. show feature-less voltage curves without any of the plateaux or capacity peaks seen with conventional crystalline $LiV_3O_8$. This behavior is symptomatic of an amorphous host material, whereas the material heat treated at 300° C. show the same behavior as the crystalline material obtained from high temperature synthesis. The spin-coated electrodes show a capacity increase during the first few cycles, as is commonly seen with compact electrodes or with poorly engineered porous electrodes. It is caused by a loss of integrity of the electrode matrix upon cycling. The resulting porosity increase facilitates ion-transport through the electrode, but also gives way to capacity deterioration. The cyclability of the electrodes heat treated at 150° C. was in all tests inferior to that of electrodes heat treated at 300° C., see FIG. 5.

Due to the very small amount of vanadium oxide present in these cells, the composition parameter x could not be determined accurately. The similarity between the curves of FIG. 4 (a & b) and that of conventional $LiV_3O_8$ together with an assumption of uniform thickness of the spin-coated films, makes it reasonable to assume, that both types of electrode material take up 1 Li/V at potentials above 2 V vs Li. Composite electrodes with freeze-dried $LiV_3O_8$ mixed with carbon black and PEO (polyethylene oxide) binder were also tested in cells with PEO-electrolyte cycled at 100° C. The behavior seems to be identical to what is known from the high temperature material.

The vanadium oxide active material ($V_2O_5$ or $LiV_3O_8$) of the invention were used to prepare cells with PC-based (polycarbonate) electrolyte/binder and lithium anodes. Several cells were prepared by mixing oxide active material, carbon (typical Shawinigan Black) and the PC-based electrolyte/binder. The oxides were prepared with and without carbon. Thus, in some cases, carbon particles were added after fine particles of the oxide active material had been formed. A typical composition is as given in Table 3.

TABLE 3

| Typical Cathode Composition | Percent by Weight |
|---|---|
| Vanadium Oxide ($V_2O_5$ or $LiV_3O_8$) | 49% |
| Carbon | 11% |
| Propylene Carbonate (PC) | 28% |
| PolyEthylene Oxide (PEO) | 1% |
| PolyEthyleneGlycolDiAcrylate (PEGDA) | 9% |
| TriMethylPolyEthylene Oxide TriAcrylate (TMPEOTA) | 2% |

The weight ratio of carbon to active material, used in conventional batteries, is approximately 1:10. An objective is to reduce the ratio and it is actually preferred to have no carbon. However, a lower limit target is a range of 3–15 weight percent carbon relative to the active material. A typical cathode contains about 10 weight percent carbon, 50 weight percent active material and the remaining material is then binder and electrolyte. The invention permits one to raise the content of the active material to about 65 weight percent. A higher content is preferred, but with the presently used materials and manufacturing techniques, a target upper limit for carbon and active material is in the range 70–80 weight percent.

The cathode was coated onto nickel foil followed by electron beam curing (cross-linking/polymerization) of the acrylate component. Then the electrolyte was coated on top of the cathode and cured with ultraviolet light. The lithium electrode was applied on top of the electrolyte separator and the battery was finally placed in a flexible pouch which was heat sealed under vacuum.

Figure 6:
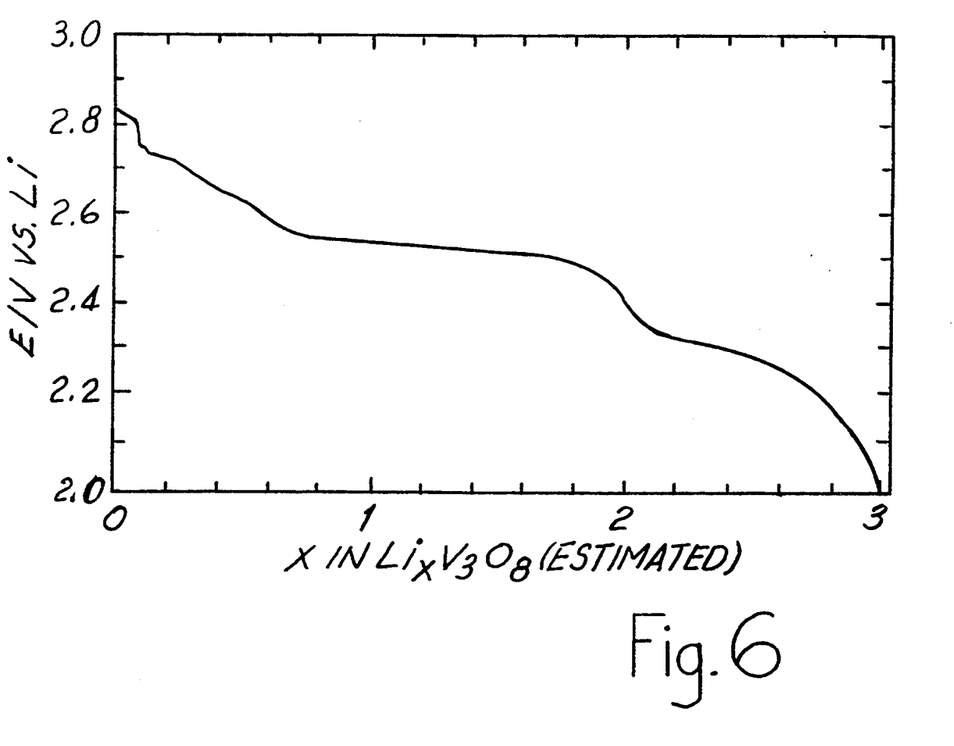

Cells with the PC-based electrolyte were tested at room temperature. Preliminary results, FIG. 6, showed the same type of voltage curve as seen with PEO electrolyte at 100° C. This indicated that the reduction of electrode capacity and changes in the shape of the discharge curve observed previously at room temperature, was a solvent effect, probably caused by propylene carbonate (PC) molecules entering into the interlayer space of $LiV_3O_8$.

The energy density of the batteries based on these new electrode materials is improved. This is believed to be achieved by decreasing carbon content of the cathode, providing better contact between the carbon and the vanadium oxide. The lesser carbon content compared to what would otherwise be required, is due to the increased contact which increases the electronic conductivity allowing higher current drains, while the energy density remains essentially unchanged.

The method of the invention eliminates, or at least reduces, the need for standard milling techniques, which reduce particle size to less than 100 microns and with which it is difficult to reduce particle size to about 50 microns. Since suitable particle size, less than 50 microns, is achieved by intimate mixing with carbon to form an electronically conducting carbon network with good contact to the active material on a microscopic scale, the invention avoids heavy-duty milling methods. However, if desired, milling of the final product is possible because the degree of milling is lessened. That is, the mixing force of any subsequent milling step would be very much reduced.

While this invention has been described in terms of certain embodiments thereof, it is not intended that it be limited to the above description, but rather only to the extent set forth in the following claims.

The embodiments of the invention in which an exclusive property or privilege is claimed are defined in the appended claims.

I claim:

1. A method of preparing a composition for an electrode, comprising:
   a) forming a mixture comprising at least one volatile constituent and an oxide of vanadium represented by the general formula $V_2O_5$; and
   b) freeze-drying the mixture of step (a) by cooling the volatile constituent to a temperature below the freezing point of such constituent under subatmospheric pressure for a time sufficient to remove a major portion of such constituent.

2. The method according to claim 1, wherein the pressure is about 0.1 mm Hg or less absolute.

3. The method according to claim 1, wherein the volatile constituent is water and the temperature is about −20° C. or less.

4. The method according to claim 1, wherein the volatile constituent of step (a) is water in an amount sufficient to provide a gel of $V_2O_5$.

5. The method according to claim 4 and including after step 1(b) heating the freeze-dried product to a temperature greater than about 100° C. for a time sufficient to reduce the water content thereof to less than 20% by weight.

6. The method according to claim 1, wherein the freeze-drying occurs for a time and at a temperature sufficient to provide a porous vanadium oxide product of the general formula $V_2O_5$ wherein such product is friable into constituent particles of a median size less than about 100 microns.

7. A method of preparing a composition for an electrode, comprising:
   a) forming a wet mixture comprising at least one volatile constituent, fine particles of carbon and an oxide of vanadium represented by the general formula $V_2O_5$; and
   b) freeze-drying the mixture of step (a) by cooling the volatile constituent to a temperature below the freezing point of the volatile constituent under sub-atmospheric pressure thereby providing the oxide of vanadium intermingled with the fine particles of carbon.

8. The method according to claim 7, wherein the pressure is about 0.1 mm Hg or less absolute.

9. The method according to claim 7, wherein the volatile constituent is water and the temperature is about 20° C. or less.

10. The method according to claim 7, wherein the volatile constituent of step (a) is water in an amount sufficient to provide a gel of $V_2O_5$.

11. The method according to claim 10 and including after step 7(b) heating the freeze-dried product to a temperature greater than about 100° C. for a time sufficient to reduce the water content thereof to less than 20% by weight.

12. The method according to claim 7, wherein the freeze-drying occurs for a time and at a temperature sufficient to provide a porous product wherein such product is friable.

13. A method of preparing a composition for an electrode, comprising:
   a) forming a wet mixture comprising at least one volatile constituent, lithium hydroxide (LiOH) and an oxide of vanadium represented by the general formula $V_2O_5$ and reacting the LiOH with the $V_2O_5$ for a time and at a temperature sufficient to provide lithium-vanadium oxide of the general formula $LiV_3O_8$; and
   b) freeze-drying the product of step (a) by cooling the volatile constituent to a temperature below the freezing point of the volatile constituent under sub-atmospheric pressure for a time sufficient to remove a major portion of such constituent.

14. The method according to claim 13, wherein the temperature of step (a) is at least about 20° C.

15. The method according to claim 13, wherein the temperature of step (a) is in a range of about 20° C. to about 60° C.

16. The method according to claim 13, wherein the LiOH is present in an amount sufficient to provide 1 mole of Li for each 1.5 moles of the $V_2O_5$.

17. The method according to claim 13, wherein the pressure is about 0.1 mm Hg or less absolute.

18. The method according to claim 13, wherein the volatile constituent is water and the temperature step (b) is about −20° C. or less.

19. The method according to claim 13, wherein the volatile constituent of step (a) is water in an amount sufficient to provide a gel of $V_2O_5$.

20. The method according to claim 19 and including after step 13(*b*) heating the freeze-dried product to a temperature greater than about 100° C. for a time sufficient to reduce the water content thereof to less than 20% by weight.

21. The method according to claim 13, wherein the wet mixture further comprises fine particles of carbon dispersed therein, thereby providing the lithium-vanadium oxide intermingled with the fine particles of carbon.

22. The method according to claim 13, wherein the freeze-drying occurs for a time and at a temperature sufficient to provide a porous oxide product wherein such product is friable into constituent particles of a median size less than about 100 microns.

23. The method according to claim 1 wherein step (b) is conducted under a vacuum.

24. The method according to claim 7 wherein step (b) is conducted under a vacuum.

25. The method according to claim 13 wherein step (b) is conducted under a vacuum.

* * * * *